May 20, 1958  C. D. MURDOCH ET AL  2,835,549
GRAPHICAL RECORDING APPARATUS
Filed March 28, 1955  3 Sheets-Sheet 1
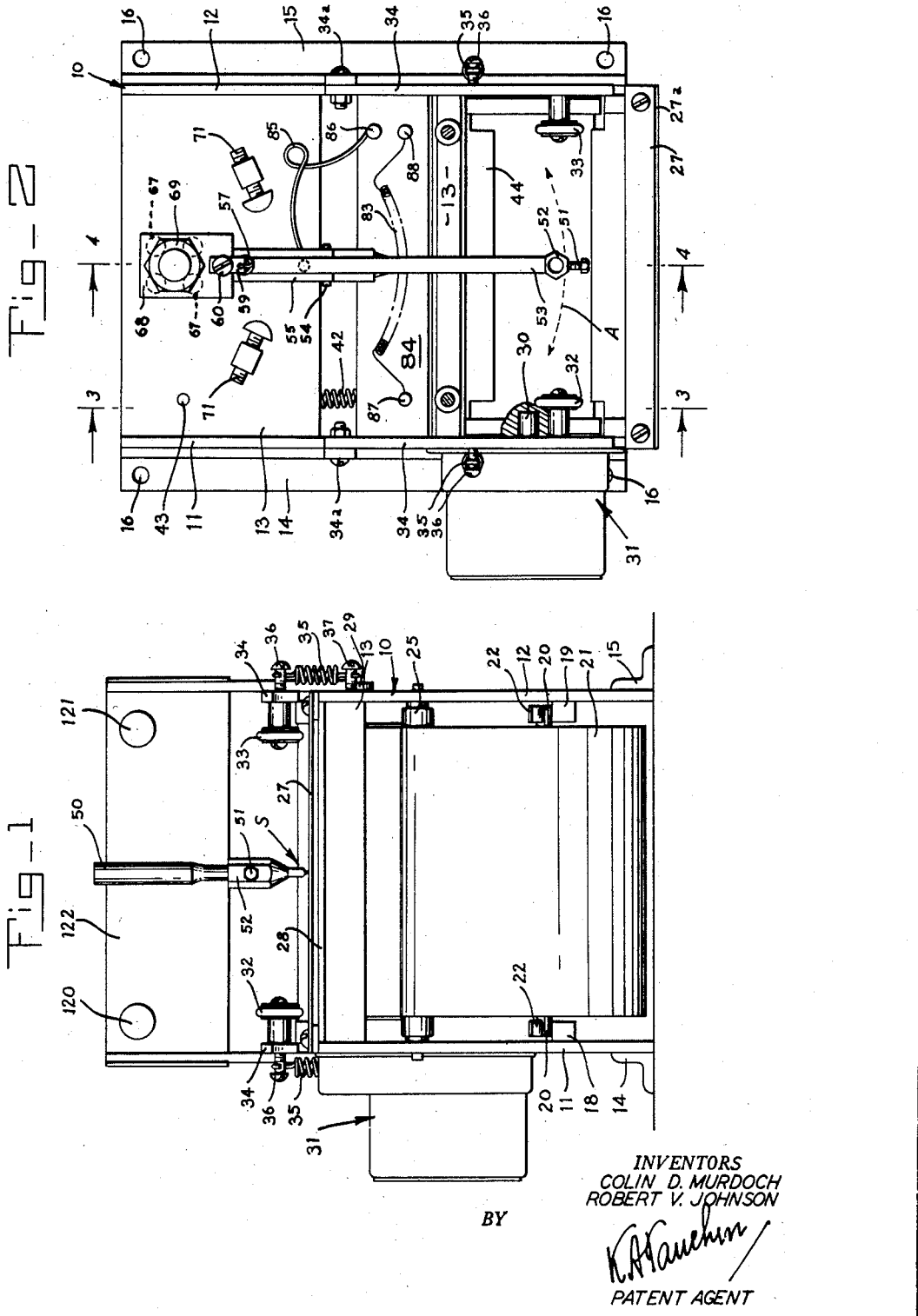
INVENTORS
COLIN D. MURDOCH
ROBERT V. JOHNSON
BY
PATENT AGENT

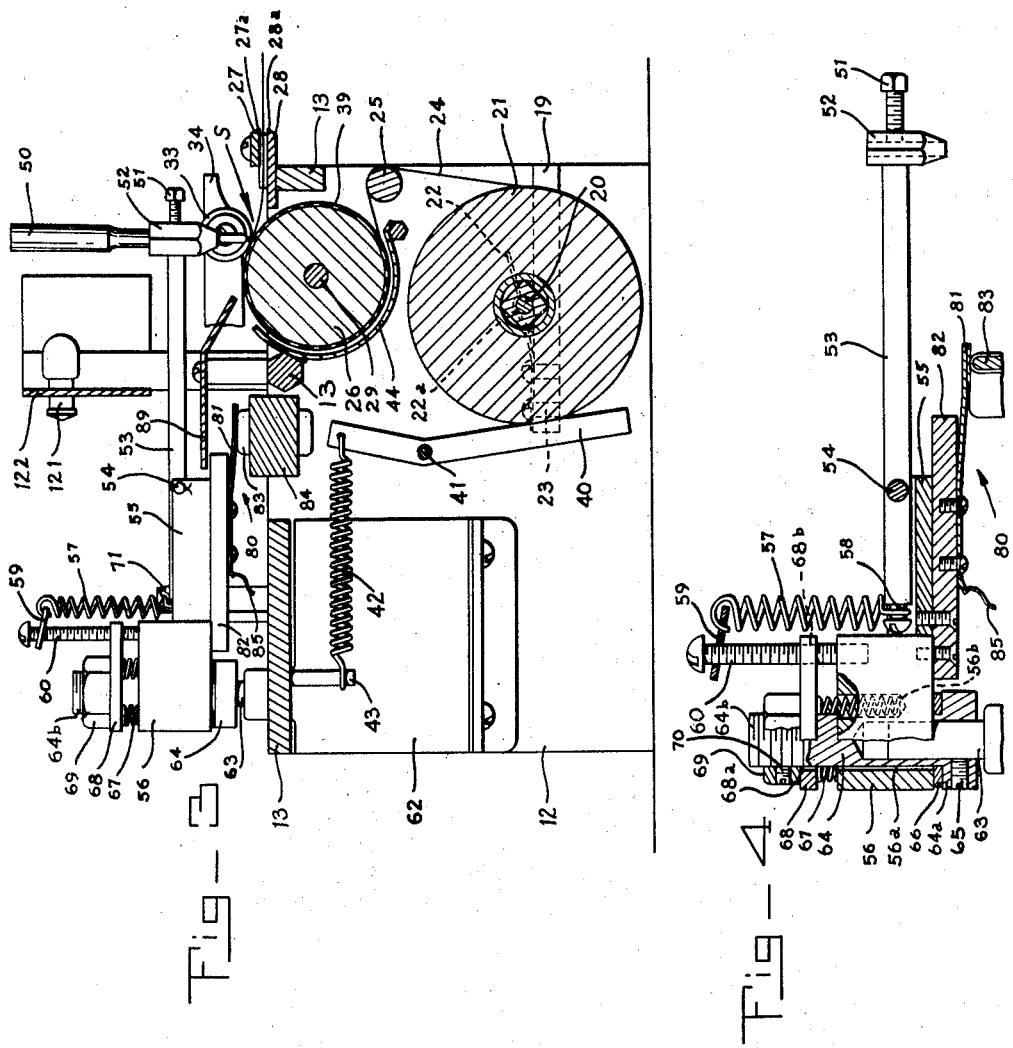

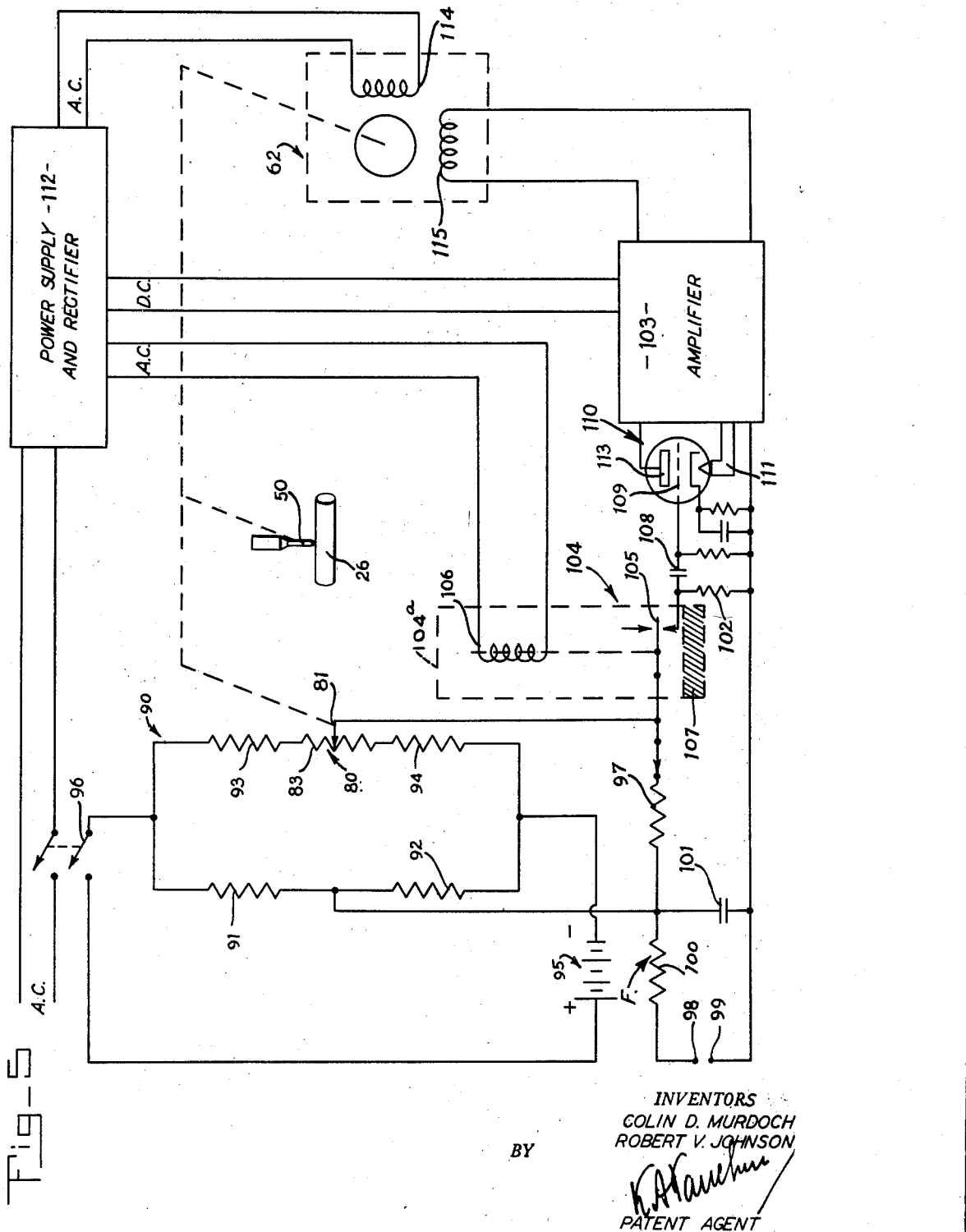

United States Patent Office 2,835,549
Patented May 20, 1958

2,835,549

GRAPHICAL RECORDING APPARATUS

Colin D. Murdoch, San Leandro, and Robert V. Johnson, San Lorenzo, Calif.; said Johnson assignor to said Murdoch Application March 28, 1955, Serial No. 497,346

2 Claims. (Cl. 346—32)

The present invention relates to recording apparatus, and, more particularly, to apparatus for providing a permanent graphical record of the magnitude and variation in magnitude and polarity of very small currents or voltages such as produced by thermocouples, thermopiles, photoelectric cells and the like.

It is an object of the invention to provide a recording apparatus, that is relatively simple and inexpensive yet which has a high degree of accuracy and sensitivity in the recording of very small currents or voltages.

Another object is to provide a graphical recorder having a pen or stylus associated with a moving strip of graph paper in a manner to produce a clear and distinct linear marking on the paper.

A further object of the invention is to provide an improved arrangement for feeding the strip of graph paper to and past the pen or marking stylus in a positive, controlled manner.

It is another object to provide a simple, direct mechanism for causing lateral displacement of the pen or stylus with respect to the moving graph in response to a change in the magnitude of a signal current or voltage which is to be recorded.

Yet a further object is to provide this pen-displacing mechanism with a fractional drive connection that enables limitation of the pen displacement regardless of the magnitude of the signal and thus obviates the necessity for the employment of electrical limit switches or the like.

It is another object of the invention to provide a recording apparatus which provides for automatic readjustment of the recording pen after the same has been accidentally or purposefully displaced from its proper position as determined by the signal current or voltage.

A further object is to provide a simple but effective arrangement for amplifying the signal to be recorded prior to its application to the pen-displacing mechanism.

These and other objects as well as the attendant advantages of the invention will become more apparent from a perusal of the following description of a preferred embodiment of the invention shown in the accompanying drawings wherein:

Fig. 1 is a front elevation of a recording apparatus constructed in accordance with the invention, certain parts thereof being broken away to expose details of construction, Fig. 2 is a plan view of the recording apparatus, with certain parts broken away to expose details underneath, Fig. 3 is a section through the apparatus, taken along line 3—3 of Fig. 2, Fig. 4 is a fragmentary sectional view of the pen-displacing mechanism taken along line 4—4 of Figure 2, and Fig. 5 is a schematic diagram of an electronic circuit utilized to amplify the signals to be recorded, and indicating diagrammatically the association of said circuit with the mechanical elements of the recording apparatus.

As shown in Figs. 1, 2 and 3, the recording apparatus includes a generally rectangular frame 10 composed of side plates 11, 12 held in spaced parallel relation by several transversely extending struts 13 of various shapes designed to accommodate the components of the apparatus. Small angle irons 14, 15 are attached to the side plates 11, 12 along their lower edges as shown in Fig. 1 and are provided with holes 16 so that the frame 10 can be bolted firmly to a horizontal surface with the side plates 11, 12 rising vertically therefrom.

Bars 18, 19 are attached, as by welding, to the interior of the side plates 11, 12, respectively, so as to extend rearwardly from the front of the apparatus and support the ends of a shaft 20 on which a roll 21 of graph paper is mounted for rotation. In order to hold the shaft 20 in the required position on the bars 18, 19, a leaf spring 22 having an indented portion 22a is secured by screws 23 to the inner or rearward end of each of the bars 18, 19 and projects forwardly over the shaft 20 with the indented portion 22a resiliently embracing said shaft so that it functions as a spring detent. This detent arrangement for positioning the shaft 20 enables its ready withdrawal and reinsertion when a new roll of graph paper is required.

The graph paper is pulled from the roll 21 upwardly along a sinuous path, as indicated at 24 in Fig. 3, to and beyond a marking point or station S whereat the paper is marked in accordance with the condition to be recorded, as will be explained in detail hereinafter. The paper first passes upwardly and over a small idler roller 25 journalled in the side plates 11, 12 adjacent the front of the apparatus and thereafter passes rearwardly and around a larger roller 26 to emerge once more at the front where it is threaded between two superposed horizontally positioned plates 27, 28 that are rigidly secured to the frame in spaced relation and which have knife edges as indicated at 27a and 28a, along which the paper strip may be torn off, if desired. The larger roller 26 is the drive roller for the paper and is secured at one end on a stub shaft 29 journalled in side plate 12 and at the other end on the inwardly projecting shaft 30 of a drive unit 31 which is mounted on the outside of the other side plate 11, as shown in Figs. 1 and 2, and includes a motor, speed reduction gearing, and an overrunning clutch of conventional design. Rubber rings 32, 33 are disposed in spaced relation radially above and adjacent the edge area of the drive roller 26. Each ring is mounted for rotation at the forward end of a bar 34 that is pivoted at its remote end 34a on a respective one of the side plates 11, 12 and urged downwardly by a small coil spring 35 (Fig. 1) tensioned between projections 36 and 37 on the pivoted bar 34 and the adjacent stationary side plate 11 or 12, respectively. Consequently the rings 32, 33 will press the graph paper against the surface of the drive roller 26 to establish driving relationship therebetween. Hence, when the roller 26 rotates, the paper will be pulled continuously from the supply roll 21 along the described sinuous path 24.

To further enhance the traction between the drive roller 26 and the paper, the surface of said roller may be made resilient as by the application of a rubber covering 39 (Fig. 3) and the graph paper is placed under tension so that it is urged against the surface of the drive roller 26 throughout its entire contact therewith and not merely at the point where the rings 32, 33 press thereagainst. To provide the desired tension, an arm 40 is pivotally mounted as indicated at 41 on the side plate 12 so as to be urged laterally against the supply roll 21 by a spring 42 tensioned between its far end and a stationary stud 43 projecting downwardly from one of the previously described transverse struts 13. In this manner, a drag is placed on the movement of the supply roll 21 and the paper dispensed from said roll is under a continuous steady tension so as to be urged into driving engagement with the rubber-covered drive roller 26. As the supply roll 21 is gradually depleted and its diameter decreases, the drag arm 40 pivots under the urgency of the spring 42 and thus maintains its contact with the roll 21. However, as the size of the paper supply roll 21 decreases, the point of contact between the arm 40 and the roll moves away from the pivot 42 of the arm, and this together with the progressive relaxation of the spring 42 is effective to reduce the force of the drag exerted by the arm 40 upon the paper roll 21. This is a highly desirable effect because as the radial size of the paper roll 21 decreases, the tangential pull of the unwound paper strip which turns the roll 21 loses progressively its mechanical advantage, and a greater effort on the part of the drive unit 31 would ordinarily be required to unwind the roll and supply the paper strip at the same rate to and past the marking station S. This may overload the motor of the drive unit and may cause the paper strip to break. Due to the automatic reduction of the tensioning drag exerted upon the paper supply roll 21 by the above described arrangement, said roll may at all times be unwound with substantially the same effort and as a result there is no danger that the paper strip may tear or that the motor of the drive unit be overloaded.

After a roll of graph paper is entirely depleted, the supporting shaft 20 therefor can be manually pulled forwardly from its position on the bars 18, 19 under the leaf springs 22, and a new roll may then be placed on the shaft. Thereafter, the shaft 20 with the new roll thereon is placed on the bars 18, 19 and pushed rearwardly until the springs 22 snap into their restraining engagement with the shaft 20. The drag arm 40 automatically adjusts its position in accordance with the diameter of the newly-inserted roll 21. After the roll 21 is properly inserted, the paper is pulled upwardly and passed around the idler roller and then pushed inwardly beneath the drive roller 26.

A curved plate 44 is rigidly supported between the side plates 11 and 12 to surround the lower and rear portions of the drive roller 26 in spaced relation thereto so that the paper is automatically directed around the drive roller when pushed thereunder as described. The leading edge of the graph paper, upon arrival at the top of the drive roller 26, is carefully fed under the rubber rings 32, 33 by manual rotation of the drive roller in a clockwise direction, as viewed in Fig. 3. The aforementioned overrunning clutch included in the drive unit 31 permits such rotation whether the motor is energized or not. Finally, the paper is passed between the plates 27 and 28 at the front of the frame 10 and the newly-inserted graph paper is in readiness to receive the markings that provide the permanent recording of the condition to which the apparatus is responsive.

The markings are applied to the paper by a suitable instrument at the previously mentioned marking station S which is located adjacent the rings 32, 33 at the top of the drive roller 26. As shown, a ball point pen 50 is clamped by a set screw 51 within a tubular socket 52 supported in substantially a vertical position at the end of an arm 53. This pen-supporting arm 53 projects forwardly above the frame 10 from its pivotal mounting on a pin 54 which horizontally bridges the upturned legs of a channel member 55 and the channel member is, in turn, attached to a block 56 arranged to pivot about a vertical axis. As a consequence the pen 50 supported by the described structure can move vertically about the axis of the pin 54 and horizontally about the axis of the block 56 along an arc A as delineated in Fig. 2.

To assure that the pen 50 will produce clear and continuous markings on the graph paper, it is urged against the paper with a predetermined amount of force by a spring 57. As best shown in Fig. 4, this spring 57 is attached to the end of the pen-supporting arm 53 remote from the pen itself by means of a screw 58 and is stretched vertically between this point of connection and a small plate 59 attached to a long screw 60 that rises from the aforementioned mounting block 56. The plate 59 is provided with an opening encompassing the screw 60 somewhat loosely so that attachment therebetween is effected by action of the spring 57 which pulls the plate into the illustrated angular disposition whereat it is wedged against the screw. A manual release of the spring tension will enable the quick adjustment of the position of the plate 59 on the screw 60 and a resultant change in the force urging the pen 50 against the graph paper. The force of the pen 50 against the paper is preferably set at about five ounces and this pressed engagement of the pen against the paper in conjunction with the cushioned support of the paper provided by the previously described rubber covering 39 on the drive roller 26 assures the desired continuity and clarity of the markings. This will be true regardless of the lateral disposition of the pen along the arc A, previously mentioned, for although movement of the pen along this arc necessitates a slight vertical movement of the pen to accommodate the curvature of the paper-supporting roller 26, vertical self-adjustment is automatically accomplished because of the permitted vertical pivoting of the pen-supporting arm 53 and the resilience of the spring 57 which urges the pen 50 into contact with the roller. It should here also be noted (Fig. 3) that the location of pen 50 is so chosen that its point contacts the paper strip in a region slightly in front of the points of contact of the traction rings 32, 33 with the paper strip on drive roller 26 as viewed in the direction of advance of said strip. Hence, the paper strip will be pulled, rather than pushed, underneath the pen point, and as a result thereof the pen may be pressed against the paper strip with a relatively high force, as mentioned hereinbefore, without danger that the paper strip may buckle as it might if it were pushed underneath the pen point.

The pen 50 is caused to move laterally along the described arc A in response to the excitation of an electric motor 62 which is bolted to one of the transverse struts 13 at the rear of the frame 10 so that its shaft 63 projects upwardly into a bore 56a in the hereinbefore described mounting block 56 and defines the previously mentioned vertical axis about which the pen 50 can move. The motor 62 is of the conventional two phase type and incorporates suitable reduction gearing so that 500 turns of the motor armature are required to effect a single turn of the projecting shaft 63. A sleeve 64 is held on the upwardly projecting shaft 63 by means of a set screw 65 that lies within a threaded radial bore in a lateral flange 64a at the lower end of the sleeve (Fig. 4). A friction washer 66 lies on top of this flange 64a and the described mounting block 56 rests thereon with its bore 56a loosely encompassing the sleeve 64 and the shaft 63 therein. Four cylindrical recesses 56b are formed in the block 56 to extend from its top downwardly at spaced intervals around the central bore 56a, only one of said recesses 56b being visible in Fig. 4. Each recess 56b receives a coil spring 67 that projects above the top of the block 56 and bears against a superposed plate 68 which has an opening 68a that loosely encompasses the sleeve 64 adjacent its upper end which is threaded as indicated at 64b. A nut 69 is screwed onto the upper threaded end 64b of the sleeve 64 so as to engage the plate 68 and compress the springs 67 between said plate and the bottom of the cylindrical recesses 56b in the mounting block 56. When the springs 67 are so compressed, the mounting block 56 is pressed against the friction washer 66 and the friction washer is, in turn, urged with the same force against the flange 64a on the sleeve 64 whereby a frictional driving connection is established between the mounting block 56 and the sleeve 64. The same frictional driving connection exists between the plate 68 and the nut 69. After the nut 69 has been screwed onto the sleeve 64 to produce the desired compression of the springs 67, it is locked on the sleeve by a set screw 70.

When the motor shaft 63 rotates, the sleeve 64 rotates therewith and the mounting block 56 is caused to rotate as a result of its frictional connection through the washer 66 to said sleeve. All of the structure supported on the mounting block 56 accordingly rotates about the vertical axis of shaft 63 and the pen 50 moves along the arc A. The compression plate 68 above the mounting block 56 also rotates as it is provided at its forward end with a small hole 68b through which the aforementioned elongated screw 60 passes to preclude rotary displacement of the two members relative to each other.

The lateral movement of the pen 50 is limited by means of adjustable stops 71 (Fig. 2), supported rigidly on one of the transverse struts 13 of frame 10, on opposite sides of the channel member 55 that mounts the pen-supporting arm 53. If the motor shaft 63 continues to rotate after the channel member 55 has engaged one of the stops 71, the described frictional drive connection between said shaft and the mounting block 56 will slip so that the pen 50 will stop its movement while the motor 62 continues to revolve. The nut 69 above the compression plate 68 is adjusted to produce a yieldable compressive force that will enable such slippage without overloading of the motor.

The shaft 63 of motor 62 is revolved in response to a signal voltage or current that is to be recorded and is supplied in amplified form to the motor 62 through an electronic circuit, as shown diagrammatically in Fig. 5. Since, as above described, the rotative position of the motor shaft 63 can be displaced relative to the pen position as a result of the permitted slippage, the excitation of the motor 62 in response to the applied signal voltage or current is automatically adjusted in accordance with the precise position of the pen 50 at the time of excitation.

To provide for such automatic adjustment, a potentiometer 80, incorporated in the circuit, is arranged so that its voltage output varies in accordance with a change in the pen position. As shown in Figs. 2, 3 and 4, the potentiometer 80 includes a leaf spring 81 which is mounted by an insulator 82 on the underside of the channel member 55 that shifts laterally with the pen 50. The free end of the leaf spring 81 resiliently engages the top of an arcuately extending resistance coil 83 rigidly supported on the frame 10 by an insulating block 84. As the pen 50 moves laterally along arc A, the leaf spring 81 moves a correlated amount along the coil 83. A wire 85 connects the leaf spring 81 to a terminal post 86 and the ends of the coil 83 are connected respectively to terminal posts 87 and 88 on the insulating block 84, as shown best in Fig. 2. A shield 89 (Fig. 3) is secured to the frame 10 immediately above the resistance coil 83 to avoid the deposit of dust thereon so that good electrical contact can be made.

Suitable wire (not shown) connect these terminal posts 86, 87 and 88 to the electronic circuit shown in Fig. 5 in such a manner that the potentiometer 80 becomes part of a bridge circuit 90 which includes fixed resistors 91, 92, 93 and 94. A direct current voltage is applied to the bridge circuit 90 from a standard cell 95 upon closure of one element of a ganged switch 96. The bridge output is applied across a resistor 97, one output contact being that furnished by engagement of the leaf spring 81 with the potentiometer coil 83. When the pen 50 is centered on the graph paper, the bridge is in balance and no voltage appears across the output resistor 97. However, as soon as the pen moves laterally, the leaf spring 81 moves along the coil 83 which unbalances the bridge and establishes a voltage across the output resistor 97, the polarity of the voltage being determined by the direction of pen movement and the voltage amplitude being determined by the amount of such movement.

Depending upon its polarity, this bridge output voltage is arranged to add to or subtract from a signal voltage which is to be recorded. As shown, a direct current signal voltage that may be the output of a pair of thermopiles, is applied to terminals 98, 99 to be supplied to a series circuit which includes the bridge output resistor 97. Said series circuit includes also a resistor 100, which forms with a capacitor 101 a filter F adapted to remove any spurious electronic noise that might be applied to the terminals 98, 99 with the direct current input voltage. The series circuit contains an additional resistor 102 and the voltage developed across said resistor 102 constitutes the input to a multi-stage amplifier 103.

The described series circuit is intermittently opened and closed by a vibrator 104 whose movable contact 105 is cyclically operated by an alternating current applied to the vibrator coil 106. Mechanical vibration or "chattering" of the movable contact 105 is damped by the attachment of a weight 107 to the vibrator case 104a, as indicated diagrammatically in Fig. 5, which increases the inertia mass of said case.

As a result of the vibrator action, the differential voltage derived from the applied signal and the voltage appearing across the bridge output resistor 97 is applied through coupling capacitor 108 to the grid 109 of the first amplifier tube 110 (across resistor 102) as an interrupted or pulsating direct current voltage having a square wave shape. Both the polarity and amplitude of this square wave voltage will be determined from the respective polarities and amplitudes of the signal voltage and the voltage appearing across the bridge output resistor 97.

The amplifier 103 is of conventional design so that although it contains preferably five or more stages, only one is indicated for purposes of illustration. The amplifier is arranged to be highly selective so that amplification is obtained only at the fundamental frequency of the applied square wave voltage. Consequently, since little amplification of the harmonic components of the square wave is obtained, the output of the amplifier 103 is substantially a pure sine wave at the fundamental frequency. For best results, the amplifier 103 should be shielded to prevent the pick up of stray noise voltages from the atmosphere and should be rigidly assembled to preclude the production of microphonic voltages that result from the vibration of tube elements. To further reduce electronic noise and thus achieve a high degree of sensitivity, the tube filaments 111 should be heated with highly regulated direct current which is obtained from a suitable power supply 112 together with well regulated direct current voltages for the anode of plate 113 of each tube.

This power supply 112 is connected to the alternating current line voltage when the previously mentioned ganged switch 96 is closed to energize the bridge circuit 90, as previously described. A portion of the voltage is rectified and directed to the amplifier 103 to supply the mentioned plate and filament voltages. Other portions of the supplied voltage are merely filtered and directed to the vibrator 104 and to one field coil 114 of the previously mentioned two phase electric motor 62 so that synchronization is established therebetween.

The other field coil 115 of the two phase motor 62 is energized by the output of the amplifier 103 and to provide the desired phase relationship, the amplifier embodies a suitable network (not shown) which shifts the phase of the applied square wave voltage by 90°. As a consequence, depending upon the polarity of the applied square wave voltage, the sine wave output of the amplifier 103 will lead or lag the line voltage as applied to the first field coil 114 by 90°. If the amplified signal voltage leads the line voltage, the motor shaft 63 will rotate in one direction; if the signal voltage lags, the shaft 63 will rotate in the reverse direction.

When the motor shaft rotates in one direction, the pen 50 moves along the arc A and simultaneously the leaf spring 81 shifts along the resistance coil 83, the mechanical connection between these elements being diagrammatically shown in Fig. 5. As the contact point on the coil 83 changes, the bridge output across the resistor 97 varies a corresponding amount. The polarity of the standard cell 95 is such that as the point of contact shifts in response to an applied signal voltage of, for example, a positive polarity, the bridge output constitutes an increasing voltage of negative polarity. Thus, when the bridge output voltage equals the signal voltage in absolute value and therefore reduces the voltage applied to the amplifier 103 to zero, no further excitation of the second field coil 115 exists and the motor shaft 63 ceases to rotate.

From the foregoing, it can be seen that excitation of the motor 62 is dependent both on the pen position and on the applied signal voltage so that a change in the pen position alone or a change in the signal voltage alone excites or energizes the motor to re-establish the proper relationship therebetween. In more concrete terms, this means that if, for example, the pen 50 is pushed, either purposefully or accidentally, from a position correlated with a constant signal voltage, the motor 62 is immediately energized to return the pen to its orginal correlated position. On the other hand, if an excessive signal voltage is applied such that lateral movement of the pen 50 is stopped before such signal voltage is equalled by the opposing voltage developed across the bridge output resistor 97, the motor shaft 63 continues to turn until said voltage is reduced, slippage being permitted by the frictional driving connection between the shaft 63 and the mounting block 56 for the pen structure as previously described. When the signal voltage drops below the value correlated with the limit of pen movement, the motor shaft 63 again moves the pen 50 and the signal voltage and bridge output voltage tend to equalize so that the signal voltage and pen position will be correlated properly regardless of the fact that the pen 50 could not "tract" the signal voltage to its excessive value.

In operation, a switch (not shown) is closed to energize the graph paper drive unit 31 and the ganged switch 96 (Fig. 5) is then closed to energize the power supply 112 for the pen-displacing motor 62 and the amplifier 103 and for the bridge circuit 90. Such energization is indicated by pilot lights 120, 121 mounted on a supporting plate 122 on the frame 10 above the pen-supporting arm 53. A signal may now be applied to the input terminals 98, 99 of the filter circuit F and the amplitude and polarity of this signal cause the pen-displacing motor 62 to move the pen 50 quickly to a position which is directly correlated with said signal amplitude and polarity, as previously explained. Any change in the signal is faithfully represented by a consequent shifting of the pen 50. After the desired record has been made, the end of the graph paper can be pulled out, since the paper drive unit 31 contains an overrunning clutch, and then torn off on the edge 27a or 28a of one of the plates 27, 28 by either an upward or downward pull.

Various modifications and alterations can be made in the described structure without departing from the spirit of the invention, and the foregoing description of one embodiment thereof is to be considered purely as exemplary and not in a limiting sense.

We claim:
1. A graphical recording apparatus comprising a reversible motor having a vertically disposed output shaft, an apertured block loosely engaged over said output shaft, a channel member rigidly secured to and projecting from said block in a direction radially of said vertically disposed shaft, an arm fitted into said channel member and projecting beyond the free end thereof, said arm being pivotally supported from said channel member for rotation about a transverse horizontal axis, a marking member supported from the projecting end of said arm, a drive roller mounted for rotation about a horizontal axis parallel to the axis of rotation of said arm and arranged to support a band of paper for movement underneath said marking member, spring means urging said marking member into marking engagement with the paper on said drive roller, stop means at either side of said channel member a predetermined angular distance from a predetermined center position thereof, and adjustable spring means yieldably urging said block into engagement with said drive shaft for rotation therewith through the angular interval determined by said stop means.

2. A graphical recording apparatus comprising a reversible motor having a first and a second field winding and a vertically disposed output shaft, an arm mounted for pivotal movement about a horizontal axis supported from said shaft for rotation therewith about its vertical axis, a marking member supported from said arm, drive means arranged to support a band of paper for movement underneath said marking member, spring means urging said marking member into marking engagement with the paper on said drive means, and means for energizing said motor in accordance with a signal voltage to be recorded, including means for applying a voltage to said first field winding, an electric circuit to which the signal voltage may be applied, a bridge circuit having means for applying a voltage thereto and a potentiometer whose contact arm is connected to said marking-member-supporting arm for movement therewith about the axis of said reversible motor shaft so that the output of said bridge circuit varies with movement of said supporting arm, and means for applying the varying output of said bridge circuit to said electric circuit in series with the applied signal voltage, and means for applying the differential voltage derived from the applied signal and the output of said bridge circuit at a phase difference to said second field winding.

References Cited in the file of this patent

UNITED STATES PATENTS

| | | |
|---|---|---|
| 1,104,949 | Zander | July 28, 1914 |
| 1,905,288 | Hoffman | Apr. 25, 1933 |
| 2,506,648 | Niemann et al. | May 9, 1950 |
| 2,530,868 | Garceau | Nov. 21, 1950 |
| 2,590,554 | Lukacs | Mar. 25, 1952 |
| 2,606,092 | Rich | Aug. 5, 1952 |
| 2,626,201 | Young et al. | June 20, 1953 |
| 2,717,192 | Chappell | Sept. 6, 1955 |